US012789482B2

(12) United States Patent
Salimi et al.

(10) Patent No.: US 12,789,482 B2
(45) **Date of Patent: *Nov. 10, 2026**

(54) SPATIAL COORDINATE TRACKING OF WIND TURBINE ASSEMBLY COMPONENTS USING LASER PROJECTION SYSTEM

(71) Applicant: TPI Composites, Inc., Warren, RI (US)

(72) Inventors: Amir Salimi, Providence, RI (US); Christopher Raine, Cranston, RI (US)

(73) Assignee: TPI Composites, Inc., Warren, RI (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/805,772

(22) Filed: Aug. 15, 2024

(65) Prior Publication Data

US 2024/0399682 A1 Dec. 5, 2024

Related U.S. Application Data

(63) Continuation of application No. 17/591,979, filed on Feb. 3, 2022, now Pat. No. 12,090,714.

(Continued)

(51) Int. Cl.

*B29C 70/68* (2006.01)
*B29C 33/12* (2006.01)

(Continued)

(52) U.S. Cl.

CPC ............ *B29C 70/681* (2013.01); *B29C 33/12* (2013.01); *G01B 11/27* (2013.01); *B29L 2031/085* (2013.01)

(58) Field of Classification Search

CPC ..... B29C 70/681; B29C 33/12; B29C 70/342; B29C 70/54; B29C 70/541; G01B 11/27;

(Continued)

(56) References Cited

U.S. PATENT DOCUMENTS 12,090,714 B2 9/2024 Salimi et al.
2011/0211168 A1 9/2011 Kim et al.

(Continued)

FOREIGN PATENT DOCUMENTS

WO WO-2018/028987 A1 2/2018
WO WO-2020/099315 A1 5/2020
WO WO-2022/169929 A1 8/2022

OTHER PUBLICATIONS

Jelinkova, H., and J. Šulc. "Laser characteristics." Lasers for Medical Applications. Woodhead Publishing, 2013. 17-46. (Year: 2013).*

(Continued)

*Primary Examiner* — Inja Song

(74) *Attorney, Agent, or Firm* — Stephen J. Kenny; Nicole A. Bustos-Pomerantz; Foley Hoag LLP

(57) ABSTRACT

A method for fabrication of a wind turbine blade includes providing a plug to define a mold, the plug including at least one female surface feature formed therein. Forming a mold, the mold configured for forming a wind turbine blade surface and having a male surface feature(s) corresponding to the at least one female surface feature of the plug. Forming a wind turbine blade surface within the mold, the wind turbine blade surface having a female surface feature (s) corresponding to the male surface feature(s) of the mold. Incorporating at least one optical marker within the female surface feature of the wind turbine blade surface. Providing predetermined optical marker location(s) associated with the wind turbine blade surface. Projecting at least one optical beam directed towards at least one optical marker. Receiving at least one reflective beam from the at least one optical marker to identify the location of the optical marker disposed on the wind turbine blade surface; and comparing (Continued)

predetermined optical marker location(s) to the identified optical marker location.

19 Claims, 8 Drawing Sheets

Related U.S. Application Data

(60) Provisional application No. 63/145,145, filed on Feb. 3, 2021.

(51) Int. Cl.
*B29L 31/08* (2006.01)
*G01B 11/27* (2006.01)

(58) Field of Classification Search
CPC . G01B 11/002; G01B 11/26; B29L 2031/085; G03B 21/2033; Y02P 70/50; B29D 99/0028; F03D 1/0675
See application file for complete search history.

(56) References Cited

U.S. PATENT DOCUMENTS

2011/0259515 A1 10/2011 Rotter et al.
2012/0213638 A1* 8/2012 Frydendal ............... B29C 70/48 416/223 R
2015/0013160 A1* 1/2015 Mathon ................... B29C 70/86 29/889.6
2015/0308404 A1 10/2015 Dahl et al.
2017/0188671 A1 7/2017 Wang et al.
2017/0312998 A1* 11/2017 Techer ..................... D03D 1/00
2018/0171968 A1 6/2018 Hunter
2018/0259863 A1 9/2018 Komaki
2018/0328335 A1 11/2018 Smith et al.
2019/0001589 A1* 1/2019 Salimi ................... F03D 1/0675
2020/0124028 A1 4/2020 Schibsbye et al.
2020/0332763 A1* 10/2020 Keohan ................. F03D 1/0675
2020/0384708 A1* 12/2020 Salimi ................... B29C 70/443
2022/0242071 A1 8/2022 Salimi et al.
2023/0249421 A1* 8/2023 Zhuravlov .............. B29C 33/12 264/247

OTHER PUBLICATIONS

International Preliminary Report on Patentability for Application No. PCT/US22/15034 dated May 12, 2022.
Supplementary European Search Report for EP Application No. 22750367.9 dated Dec. 2, 2024.

* cited by examiner

Nominal

Wide bonding Gap

Chord wise Misalignment

Web Rotation

SPATIAL COORDINATE TRACKING OF WIND TURBINE ASSEMBLY COMPONENTS USING LASER PROJECTION SYSTEM

CROSS-REFERENCE TO RELATED APPLICATIONS

This application is a Continuation of U.S. application Ser. No. 17/591,979 filed Feb. 3, 2022, which claims the benefit of priority under 35 U.S.C. § 119(e) of U.S. Provisional Application No. 63/145,145 filed Feb. 3, 2021, the entire contents of which are hereby incorporated by reference.

THE FIELD OF THE DISCLOSED SUBJECT MATTER

The disclosed subject matter relates to a system, and corresponding method, of manufacturing large scale composite structures, e.g. wind turbine blades. These large scale composite structures are typically formed from a two-piece mold which, once the blade halves are molded, require a complex component location/installation, and subsequent mold closure process, to complete fabrication.

Particularly, the present disclosure provides an accurate and precise component coordinate tracking system which facilitates both placement and assembly of blade components, e.g., spar caps.

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. An exemplary view of a mold half for a wind turbine blade is illustrated schematically in FIG. 1A-C.

Referring to FIG. 1*a*, this shows a mold 10 for a wind turbine blade divided into two half molds, an upper suction-side mold 10*a* and a lower pressure-side mold 10*b*, which are arranged side by side in an open configuration of the mold. A pressure side blade shell 12*a* is supported on a mold surface 14*a* of the lower mold 10*a* and a suction side blade shell 12*b* is supported on a mold surface 14*b* of the upper mold 10*b*. The shells 12*a*, 12*b* are each made up of a plurality of glass-fiber fabric layers, which are bonded together by cured resin.

After forming the shells 12*a*, 12*b* in the respective mold halves 10*a*, 10*b*, shear webs 16 are bonded to spar caps positioned on or within an inner surface 17 of the windward blade shell 12*a*. The shear webs 16 are longitudinally-extending structures that bridge the two half shells 12*a*, 12*b* of the blade and serve to transfer shear loads from the blade to the wind turbine hub in use. In the particular embodiment shown in cross-section in FIG. 1*a*, the shear webs 16 each comprise a web 18 having a lower edge 19 comprising, optionally, a first longitudinally-extending mounting flange 20 and an upper edge 21 comprising, optionally, a second longitudinally-extending mounting flange 22. Adhesive such as epoxy is applied along these mounting flanges 22 in order to bond the shear webs 16 to the respective spar caps of each half shell 12*a*, 12*b*.

As shown in FIG. 1*b*, once the shear webs 16 have been bonded to the upper blade shell 12*a*, adhesive is applied along the second (upper) mounting flanges 22 of the shear webs 16, and along the leading edge 24 and trailing edge 26 of the blade shells 12*a*, 12*b*. The upper mold 10*b*, including the upper blade shell 12*b*, is then lifted, turned and placed on top of the lower blade mold 10*a* in order to bond the two blade half shells 12*a*, 12*b* together along the leading and trailing edges 24, 26 and to bond the shear webs 16 to spar caps along an inner surface 28 of the upper blade shell 12*b*. The step of placing one mold half on top of the other is referred to as closing the mold.

Referring now to FIG. 1C, a problem can arise when the mold 10 is closed whereby the shear webs 16 may move slightly relative to the upper shell 12*b*. For example, the shear webs 16 may move slightly under their own weight during mold closing or they may be dislodged by contact with the upper shell 12*b*. Additionally or alternatively, the shear webs and spar caps can be inaccurately placed within the open mold halves prior to closing, resulting in a compromised or defective blade build. Furthermore, the concave curvature of the upper shell 12*b* also has a tendency to force the shear webs 16 together slightly, as shown in FIG. 1C. Such movement of the shear webs 16 during mold closing may result in the shear webs 16 being bonded to the spar caps and/or upper shell 12*b* at a sub-optimal position.

As blades are ever increasing in size in order to improve the operational efficiency of wind turbines, safety margins decrease thus requiring manufacturing acceptance criteria and tolerances to become stricter. This necessitates the design and implementation of manufacturing tools that enable high precision process checks to satisfy strict specifications and requirements.

The current disclosure introduces new tools and techniques to enable over-head optical projection systems to verify the exact spatial state of the assembly components confirming the desired assembly configuration. There thus remains a need for an efficient and economic method and system for providing high precision placement and bonding of the internal components, e.g. spar caps, during the assembly phase of wind turbine devices that ensure proper placement of the components, without impacting the structure of the product.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method for fabrication of a composite structure comprising: providing a mold configured for forming a composite structure, the mold including at least one surface feature for receipt of an optical marker; forming a composite structure within the mold, the composite structure including an optical marker disposed at the at least one surface feature of the mold; providing predetermined optical marker location(s) associated with the composite structure; projecting at least one optical beam directed towards at least one optical marker; receiving at least one reflective beam from the at least one optical marker to identify the location of the optical marker disposed on the composite structure; comparing predetermined optical marker location(s) to the identified optical marker location.

In some embodiments, the comparison of the predetermined optical marker location(s) and the identified optical marker location do not match, adjusting the placement of the composite structure.

In some embodiments, projecting is performed by a plurality of lasers, which can be configured for relative movement with respect to the mold, configured for relative movement with respect to each other.

In some embodiments, an optical marker is disposed on each side of a shear web.

In some embodiments, a plurality of optical beams are projected simultaneously towards a plurality of optical markers.

In some embodiments, select beams are projected in a serial fashion.

In some embodiments, the composite structure is a wind turbine blade.

In some embodiments, the surface feature is formed as an aperture.

In some embodiments, the surface feature is formed as a recess.

In accordance with another aspect of the present disclosure, a method for fabrication of a wind turbine blade is disclosed comprising: providing a plug to define a mold, the plug including at least one female surface feature formed therein; forming a mold, the mold configured for forming a wind turbine blade surface and having a male surface feature(s) corresponding to the at least one female surface feature of the plug; forming a wind turbine blade surface within the mold, the wind turbine blade surface having a female surface feature(s) corresponding to the male surface feature(s) of the mold; incorporating at least one optical marker within the female surface feature of the wind turbine blade surface; providing predetermined optical marker location(s) associated with the wind turbine blade surface; projecting at least one optical beam directed towards at least one optical marker; receiving at least one reflective beam from the at least one optical marker to identify the location of the optical marker disposed on the wind turbine blade surface; comparing predetermined optical marker location(s) to the identified optical marker location.

In some embodiments, projecting at least one optical beam includes a plurality of lasers, each laser aligned with a plurality of optical markers.

In some embodiments, projecting at least one optical beam includes a plurality of lasers, the lasers are configured for relative movement with respect to the mold.

In some embodiments, projecting at least one optical beam includes a plurality of lasers, the lasers are configured for relative movement with respect to each other.

In some embodiments, the optical markers are embedded within the wind turbine blade surface.

In some embodiments, the optical markers are coupled to the surface of the wind turbine blade surface.

In some embodiments, the optical markers are configured as mirrors.

In some embodiments, the optical markers are disposed between the leading and trailing edge of the blade.

In some embodiments, the optical markers are incorporated within into the wind turbine blade surface prior to closing a first mold half onto a second mold half.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1A:
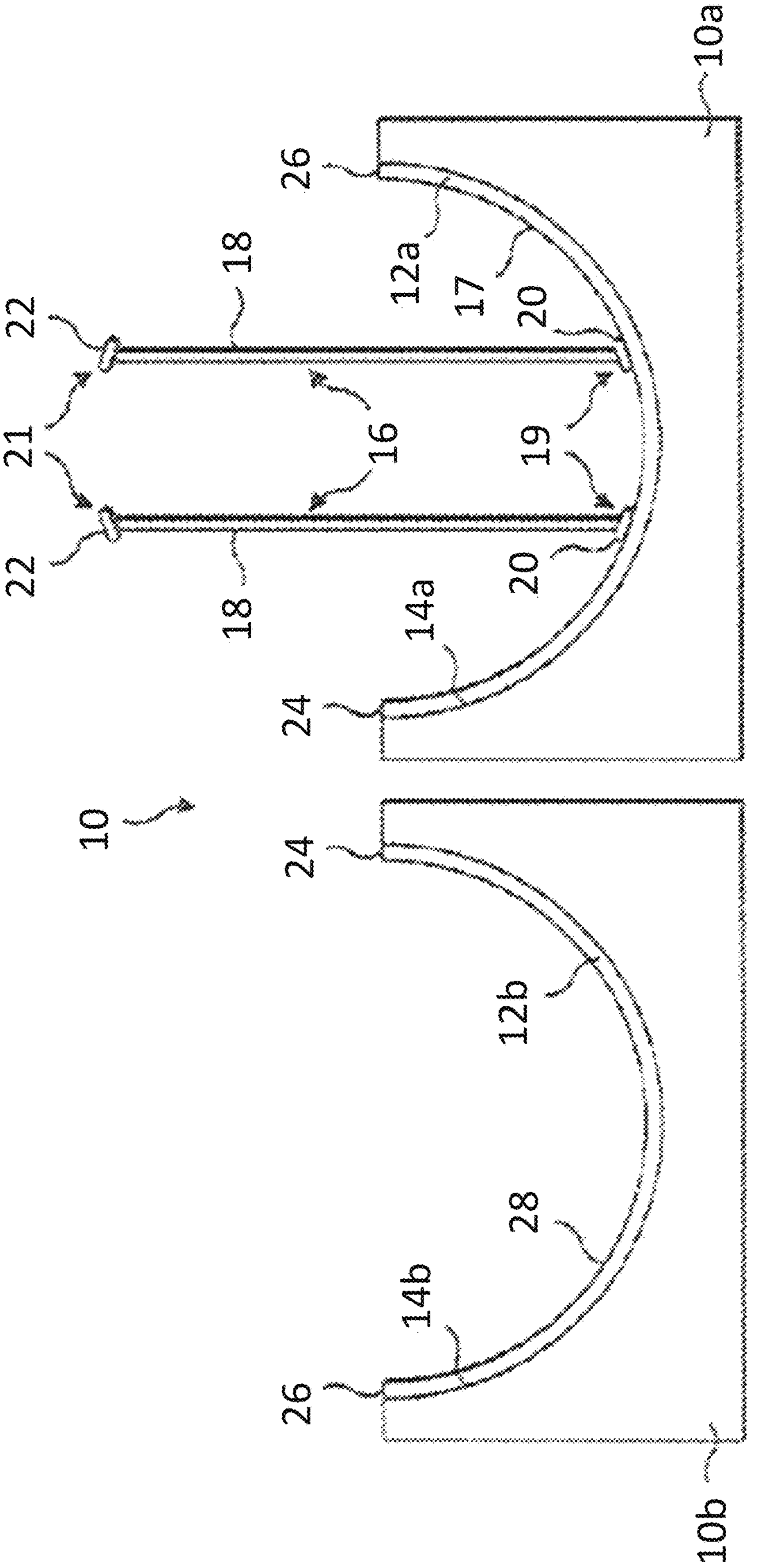
FIGS. 1A-C depict cross-sectional views of a conventional wind turbine blade mold and manufacturing method.
Figure 1B:
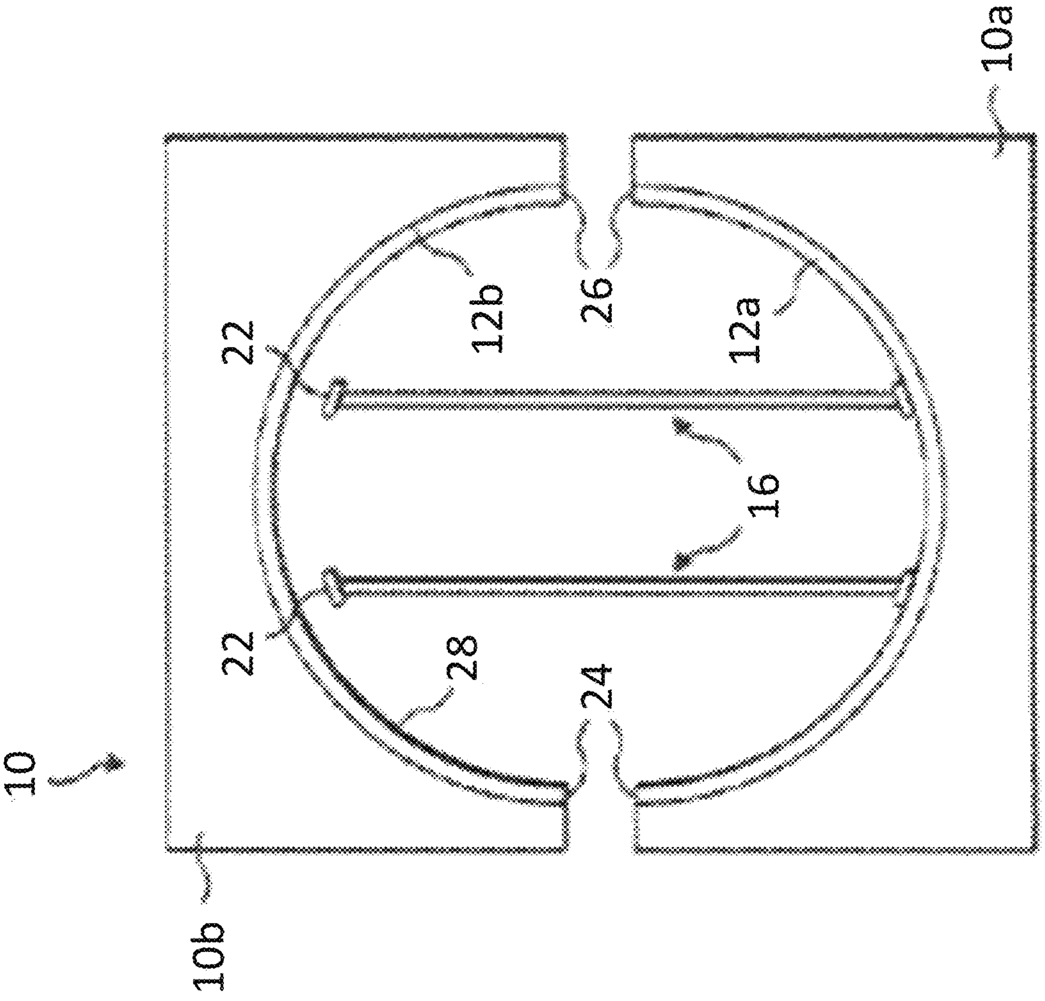
Figure 1C:
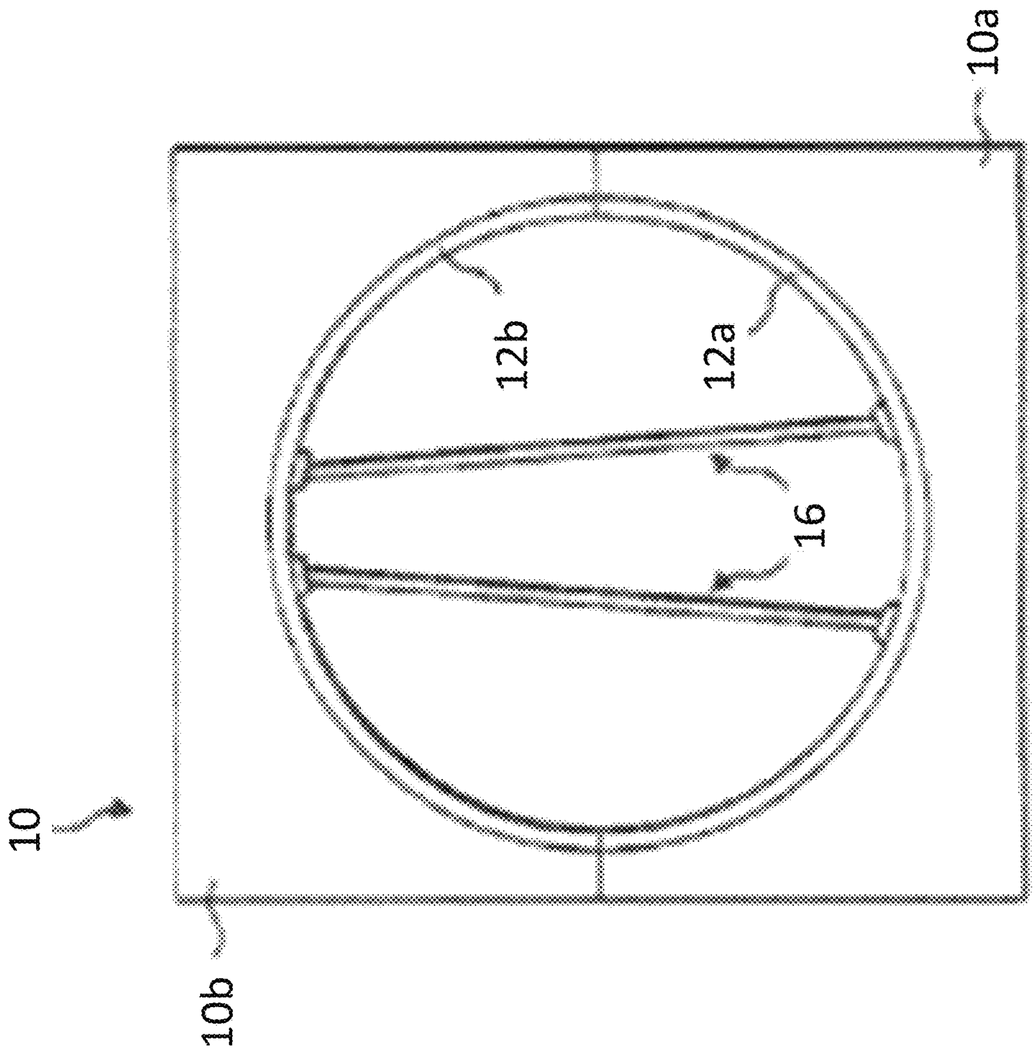

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for composite structure construction—e.g. automotive components, marine components and construction components, etc. The disclosed subject matter is particularly suited for construction of wind turbine blades. For purpose of explanation and illustration, and not limitation, an exemplary embodiment of the system in accordance with the disclosed subject matter is shown in FIGS. 2-6 and is designated generally by reference character 1000. Similar reference numerals (differentiated by the leading numeral) may be provided among the various views and Figures presented herein to denote functionally corresponding, but not necessarily identical structures.

A blade may include one or more structural components configured to provide increased stiffness, buckling resistance and/or strength to the blade. For example, the blade may include a pair of longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members separate into one or more pultruded member bundles as the spar cap approaches the blade root so as to form a second portion of the spar cap.

More specifically, the spar cap is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

The present disclosure introduces new tools and techniques to enable over-head optical projection systems to verify the exact spatial state of the assembly components confirming the desired assembly configuration.

Retroreflective Optical Markers

The methods and systems described herein facilitate high precision component placement, e.g. spar caps, during molding processes. Particularly, the present disclosure introduces a novel apparatus and method which provides accurate geometric references throughout the blade span. The present disclosure can include over-head optical projection and laser tracking systems to assist in locating, and measurement tools to place components and reinforcement layers (or "layup" kitting segments) during layup process.

Figure 2:
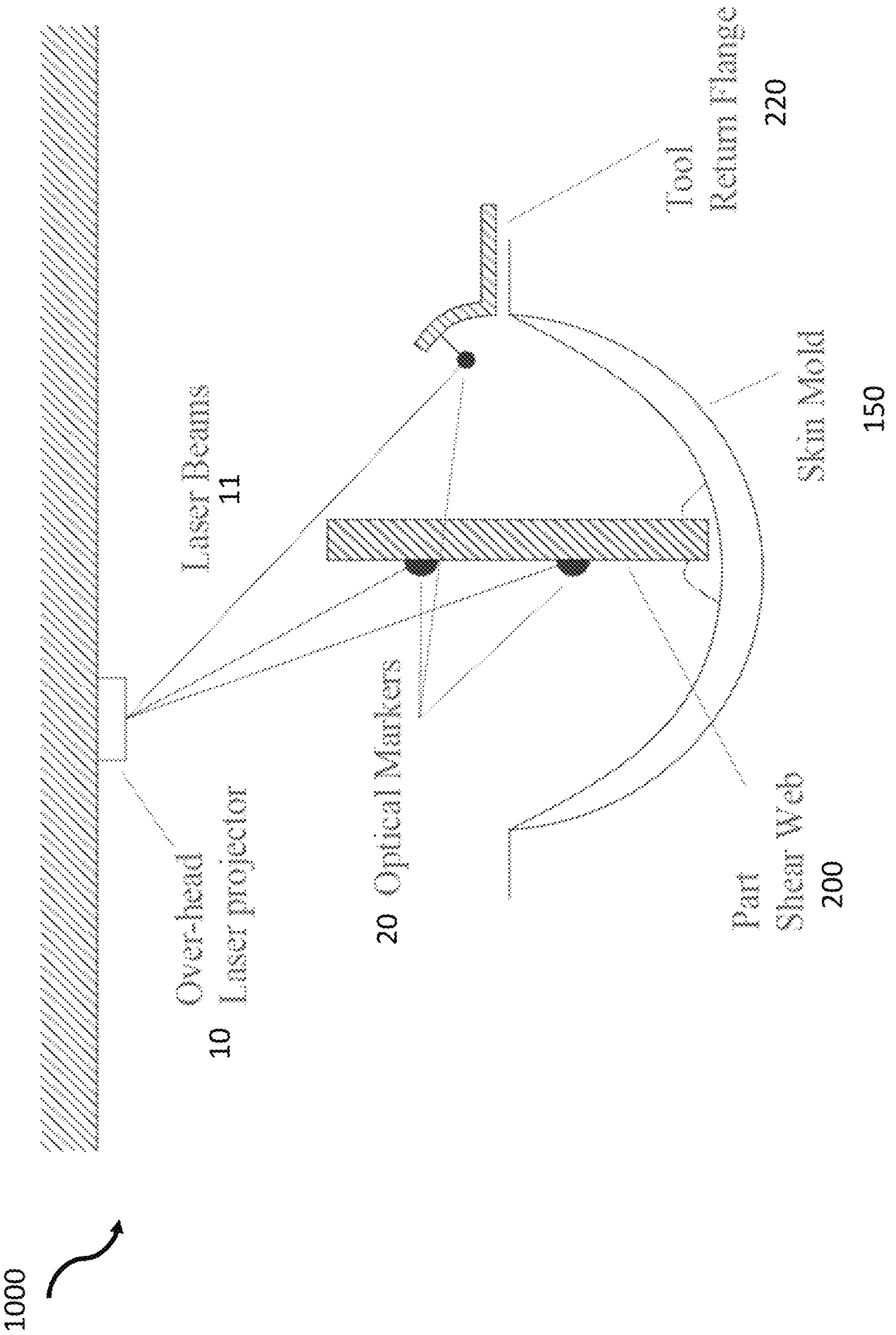
FIG. 2 is an exemplary view of optical reference markers at various internal (i.e. within the blade interior once the two blade halves are closed upon each other) locations, and on various components, in accordance with an embodiment of the disclosed subject matter.

FIG. 2 depicts a longitudinal (i.e. spanwise view from root to tip) cross-sectional schematic of a blade half, with a plurality of markers 20 distributed along the blade span. The markers 20 can be configured as retroreflective optical markers which are positioned on the surface of a blade component, and/or or skin surface, that reflects radiation (e.g. light) back to its source 10 with minimum scattering. In some embodiments, the radiation source is an overhead optical (e.g. laser) projector(s). Each projector 10 can project a plurality of beams 11, with each beam dedicated and directed towards a single marker 20. In some embodiments, the trajectory of beams 11 can be adjusted to irradiate a plurality of markers 20. The relative coordinates of the overhead projector(s) can be fixed with respect to the blade mold during the manufacturing process. Similarly, in some embodiments the overhead projectors(s) remain fixed during operation; conversely, in some embodiments the overhead projectors can be adjusted (e.g. laterally, longitudinally and vertically such as lowered towards the mold).

In some embodiments, the markers 20 are configured as a separate device or component that is (removably) attached to the blade component/surface. In some embodiments each marker 20 can reflect a unique spectrum (e.g. color) of light from the source 10. Additionally or alternatively, the marker 20 can be a surface feature integrally formed with the component/surface. The number and location of the markers 20 can vary depending on blade design specifications, e.g., number of spar caps and shear webs, location and size, etc. As shown in FIG. 2, the distribution of markers 20 need not be uniform but instead concentrated in select areas of the blade. The number, distribution and geometry of the markers 20 can vary along the blade span, e.g., there can be a greater concentration of markers 20 at locations with large/heavy internal components and/or more complex geometry or surface contours, e.g., with a greater number of markers 20 located proximate the root as compared to the tip of the blade.

FIG. 2 depicts an exemplary embodiment of markers 20 having a bulbous, e.g. semispherical shape which projects outwardly from the exterior surface of the blade component 200; however markers of alternative geometries (e.g. curved, non-linear, asymmetrical) are within the scope of the present disclosure. In some embodiments the markers are configured with a curved surface(s). Additionally or alternatively, in some embodiments the markers are formed with linear surfaces (e.g. facets). As shown, the retroreflective optical markers 20 placed on the body of the assembly components enable the over-head projection system to capture the spatial position of components. In embodiments in which a complete 3-Dimensional tracking of each part is desired, multiple markers on are included at different points (e.g. top surface, left side, right side, width, etc.) located on the assembly item.

Figure 3:
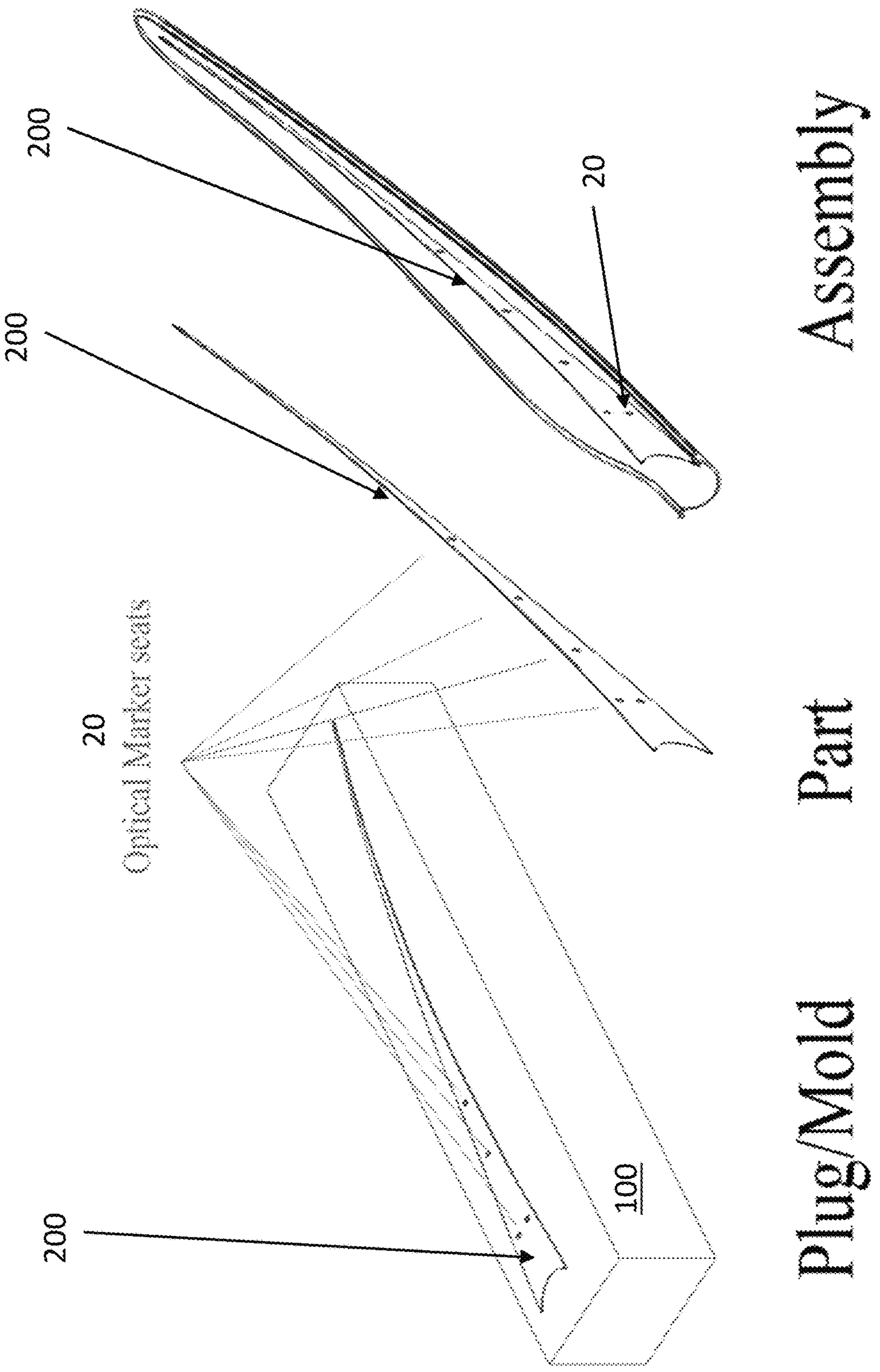
FIG. 3 is an exemplary view of a shear web locating/tracking process during transport from the mold to insertion within the blade shell in accordance with an embodiment of the disclosed subject matter.

The coordinates of selected markers are predetermined to accurately support the tracking process. Accordingly, location of the reference markers 20 is first specified in the 3D manufacturing model of the blade mold, and are specific to the component geometry as well as the data that is desired to be collected. In order to fabricate the mold (which will be employed to fabricate wind turbine blades), a male "plug" is first formed to serve as the structure which imparts the specified geometry into the mold. During plug build, marker points are formed, e.g., CNC machined, into the plug surface. The marker locations are thereafter transferred to or imparted within the final mold and can serve as a seat for hosting/receiving retroreflective markers. Application of this process for locating shear web 200 is shown in FIGS. 2-3.

In the exemplary embodiment shown in FIG. 2, a mold 150 is provided to form a half blade shell or skin. A plurality of blade components, e.g. shear web 200 and return flange 220, are provided each having at least one optical maker 20 attached thereto. The markers can be affixed or integrated directly into the component surface, as shown for the shear web 200. Additionally or alternatively, the markers 20 can be a discrete structure that is coupled to the component via an arm that extends from a surface of the component, as shown for the return flange 220. The arm can be sized, and positioned, and articulated such that the marker 20 is not obscured from the field of view of the overhead projector 10 such that the beams 11 projected therefrom are not blocked or interrupted by a portion of the flange component 220.

The tracking system disclosed herein allows for the identification (and thus correction) of misalignment of various component parts during blade assembly. Also, the tracking system disclosed herein allows for the identification (and thus correction) of misalignment of a given component about multiple axes or reference planes and datum. FIGS. 4A-D illustrates the process of tracking shear web 200 assembly, which is the most critical element in closing process.

Figure 4A:
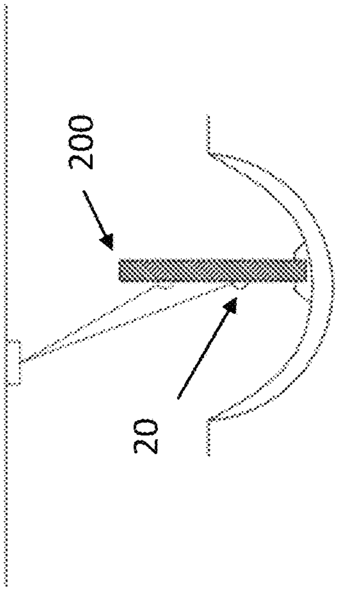
FIG. 4A-D are exemplary views of a shear web locating/tracking process during insertion within the blade shell in accordance, depicting exemplary displacements of the shear web relative to the blade shell, in accordance with an embodiment of the disclosed subject matter.
Figure 4B:
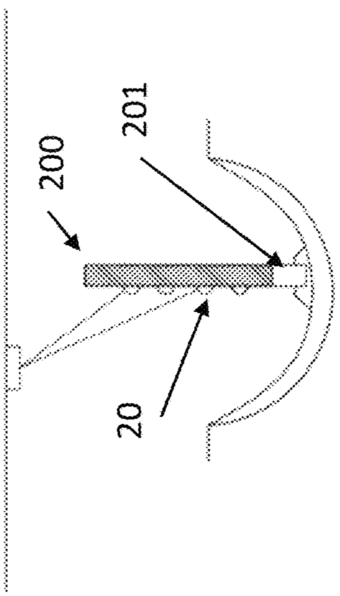

For example, FIG. 4A illustrates how a shear web is actually positioned within a blade (the remaining views compare an actual shear web location to an ideal/model location). That is, vertical geometric misalignments of shear web can be detected using the presently disclosed system and are shown comparison of the actual web location (shown in solid cross-section hatch) to the ideal/model location—denoted by reference numeral 201 in FIG. 4B. Here the web 200 is elevated a distance greater than that of the model 201, evidenced by the markers 20, which can be detected and corrected.

Figure 4C:
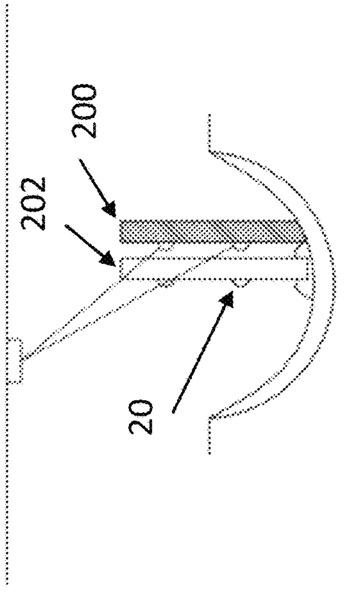
Figure 4D:
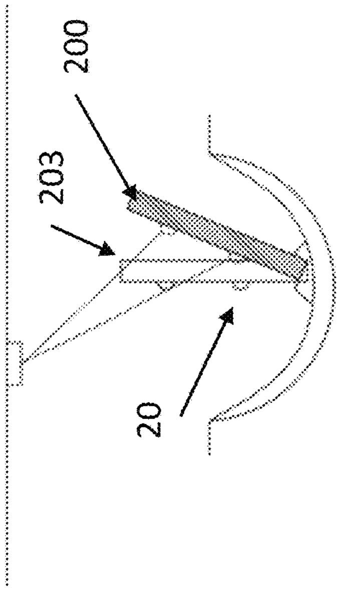

Similarly, chord-wise misalignment can be detected using the present system, as shown by reference numeral 202 in FIG. 4C. Here the web 200 is misplaced (i.e. positioned to the left in the view shown) relative to the predicted/ideal location as defined in the 3D model (evidenced by web 202), with the markers 20 allowing for this misplacement to be detected, quantified, and corrected.

Additionally or alternatively, the marker system disclosed here allows for detection of web rotation. As shown by reference numeral 203 in FIG. 4D, any variance between the vertical orientation of a web from the 3D model (evidenced by web 203) and the actual installation of a web within the blade (evidenced by web 200) can be detected, quantified and corrected. In some embodiments, the overhead laser can: i) detect misplacement of the component, e.g. shear web; and ii) provide corrective instruction, e.g., project the correct placement by superimposing visual (and audio) aids to cue the operator how far and in what direction to shift the component into the correct position.

Figures 5A, 5B, 5C:
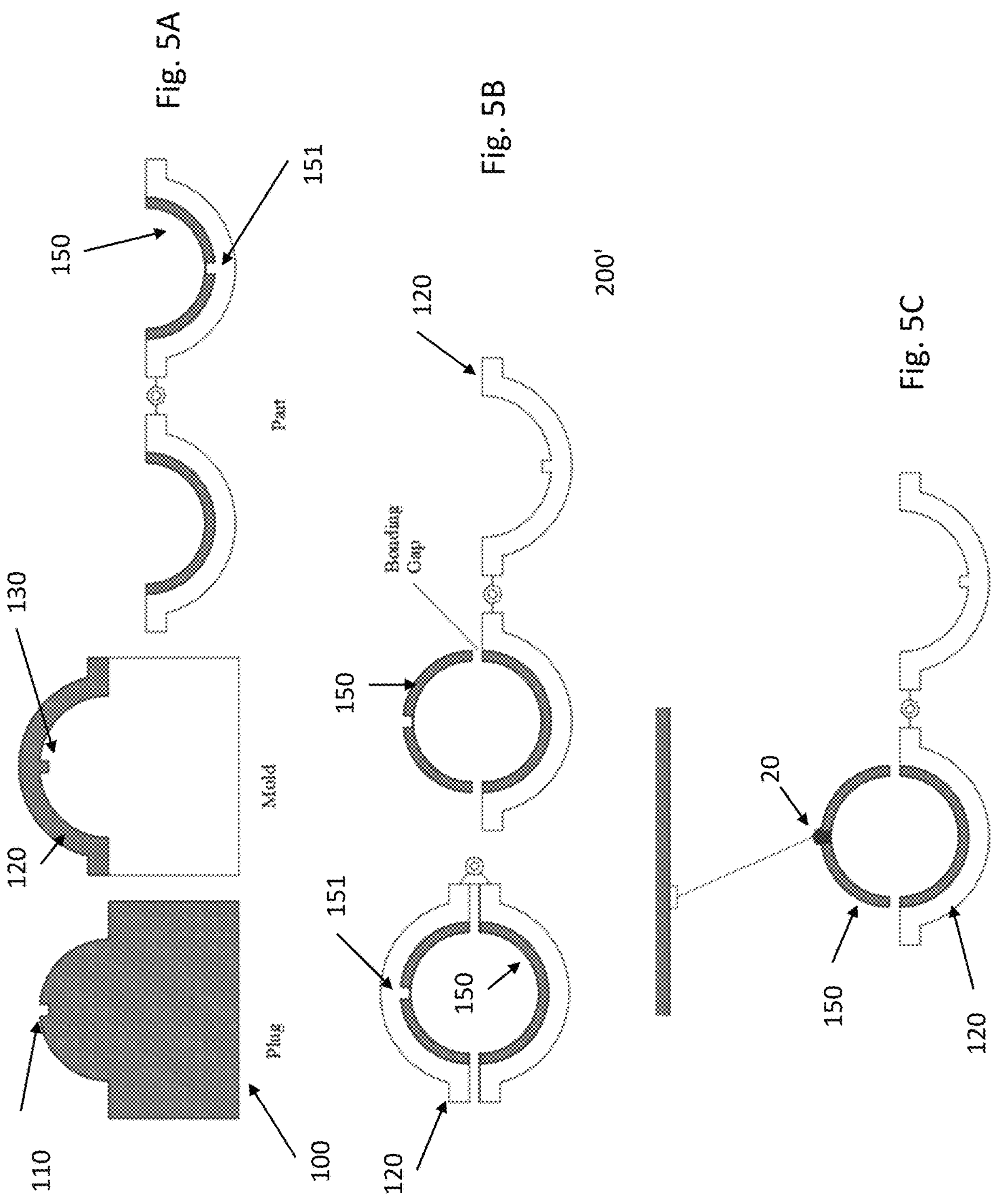
FIG. 5A-C are exemplary views of spatial position tracking during a blade closure process (e.g. rotating a mold half) in accordance with an embodiment of the disclosed subject matter.

FIG. 5A-C depicts the mold closure operation (i.e. a lower mold containing a half blade, and an upper mold containing a half blade, are rotated together to form a complete blade). As shown in FIG. 5A, first a plug 100 is formed (e.g. CNC machining as described above), with a surface feature 110 (e.g. recess or aperture) to designate the location for positioning of a marker in subsequent operation steps. From this plug, a mold 120 is formed which has a male surface feature 130 (e.g. protuberance) which corresponds with the female surface feature 110 of the plug. The remainder of the mold is formed with the desired geometry for the particular blade to be manufactured (e.g. radius of curvature, taper, etc.). As shown in FIG. 5B, the blade halves (or "skins") 150 are formed within the mold 120, with a surface feature (e.g. recess or aperture) 151 formed within the exterior surface of the blade skin which is configured to receive the marker. Thereafter, at least one mold half 120 is pivoted or rotated on top of the adjacent mold half to form a closed mold and thus bring the leading and trailing edges of the blade halves into engagement for bonding. As shown in FIG. 5C, upon opening of the mold halves 120, the marker 20 can be incorporated into the surface feature 151 for confirmation that the formed product meets design specifications as well as tracking during subsequent operations.

By transferring the reference points from shell plug to the aerodynamic surface of the blade, over-head laser projection system can track the blade in real-time, even when the blade is in a closed/assembled state. This not only helps identify any issues such as crushing condition (during mold closure) or improper binding (e.g. along leading/trailing edges) but also allows for capturing any time dependent deformation of the mold, e.g., due to temperature variation.

Thus, the system of the present disclosure provides a process to measure the spatial position of multiple component parts in the mold, and verify any assembly errors. In some embodiments the markers are permanently coupled to the respective blade components and/or surfaces. In some embodiments, the markers can be removably coupled to the respective blade components and/or surfaces, such that the markers can be removed from a properly assembled blade and recycled or reused in subsequent operations, if desired.

Figure 6:
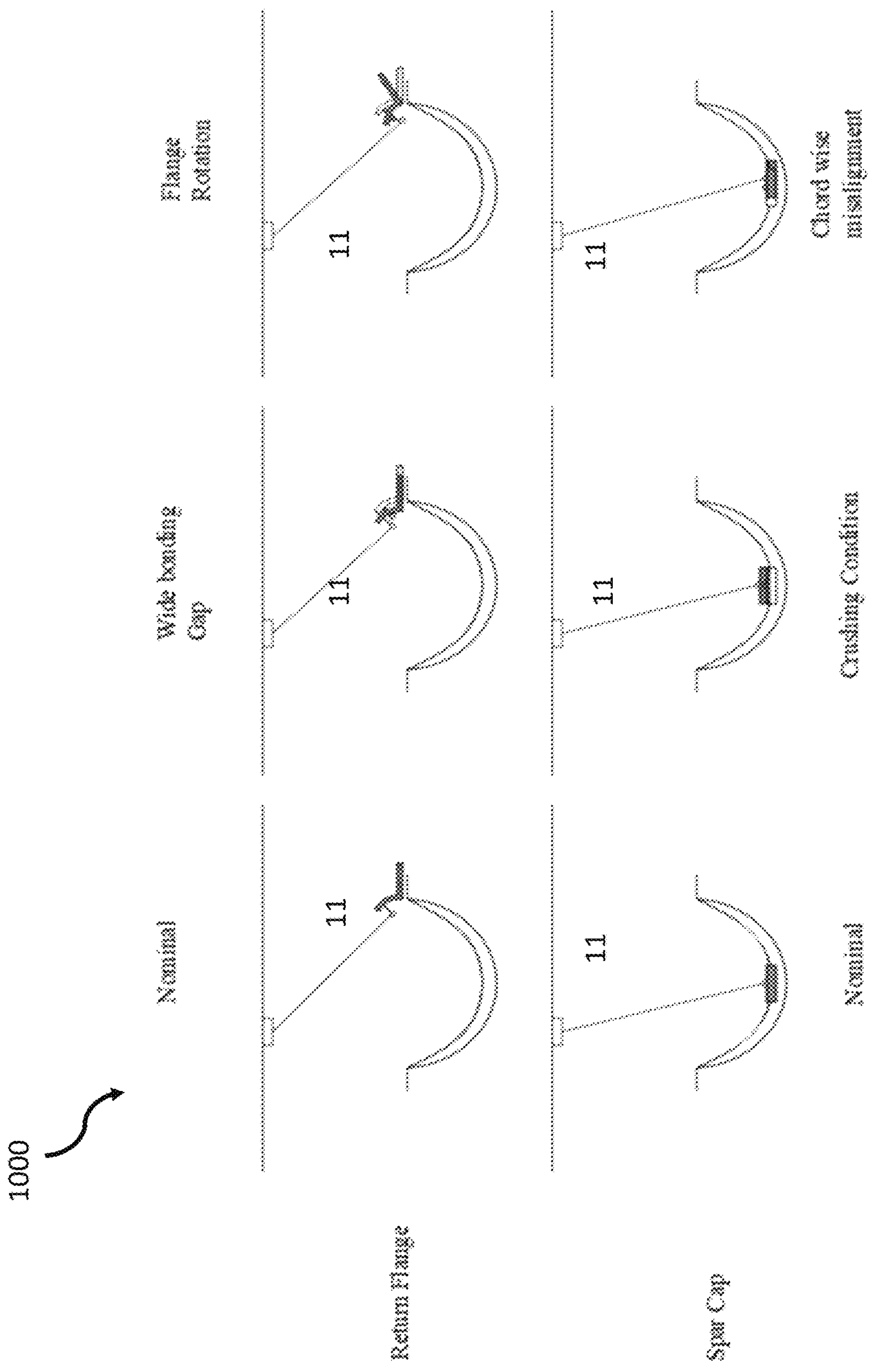
FIG. 6 is an exemplary view of additional applications for spatial position tracking, e.g. return flange and spar cap, in accordance with an embodiment of the disclosed subject matter.

There are many other applications outside closing components (e.g. placement of spar caps and return flange during layup) for implementing the spatial position tracking approach that would be enabled by considering proper designs as shown in FIG. 6. Some exemplary errors or component misplacement that the present disclosure can identify are if the bonding flange (middle figures) is erroneously displaced laterally inward/outward (see solid cross sectional flange) from the location designated by the 3D model (see flange without cross sectional shading). Furthermore, the present disclosure can detect if the bonding flange (which can be removably inserted between upper and lower mold halves prior to closing) has rotated relative to the lower mold.

Referring now to the second row of images in FIG. 6, the present disclosure can detect if the spar cap has been, or will be upon closing of the upper mold, compressed or pushed downward beyond the desired depth within the blade skin (as shown in middle figure). Additionally, any chordwise misplacement of the spar cap can be detected (as shown in the figure on the right).

In accordance with another aspect of the present disclosure, any of the displacements detected by the optical markers herein can be both identified, and quantified or measured (since the location of the markers is known, and the positioning of the component is known from the 3D model). From these two known value sets, a delta can be performed to determine how far, and in what direction, the blade component should be shifted so that it matches the location of the 3D model.

In some embodiments, structures/surfaces which are located within the root section can have a greater number of markers provided than panel pieces which are installed within the tip section of the blade. In some embodiments, all markers are targeted by the projector whereas in other embodiments only select markers of a given component are specified for targeting with the laser beam. For instance, in regions of the mold in which the contour is changing across panels, a greater number of markers can be specified to provide a higher density mapping to accurately capture the gradient of the mold.

The projection coordinates can be sent to all optical projectors, or in some embodiments only select projectors (e.g. root marker projection locations sent to only those optical projectors which reside above the root section of the mold/blade). Also, the projection files can include a key (e.g. prefix or suffix, similar to addressing of Internet Protocol packets) which signals that two particular projection files are to be maintained in a consecutive manner as they are directed to adjacent panels within the mold.

During the core placement process on the shop floor, the projected laser lines are used to identify the structures/surfaces that are deviating from the model. In some embodiments the identification of deviation can be performed automatically (e.g. optical camera) with predefined acceptable tolerance ranges. Additionally, or alternatively, the identification of deviation can be performed (or confirmed, if initially performed automatically) via manual inspection by the operator. When a deviation beyond the acceptable limits is identified, the structure/surface can be repositioned, or discarded, as desired. Also, an alert can be signaled if/when a structure/surface deviates beyond the acceptable tolerance to highlight this deviation. In some embodiments a confirmation that the deviation has been addressed must be entered in order for a subsequent projection pattern to be projected.

The magnitude of acceptable error/deviation can depend on the materials employed, and the operating environment for a given blade. In some embodiments the acceptable error, or tolerance, can vary along and across the blade location. For example, the acceptable tolerance, or range deviation, can be smaller at locations of material transition and/or thickness transitions, as well as along the leading and trailing edges.

In the exemplary embodiment shown in FIGS. 2-6, a series of lasers (11) are positioned above the wind turbine mold and project patterns downward onto the mold during the manufacturing process. The number of laser projectors depends on the length of the blade as well as the height of the projectors with respect to the mold surface. The position of projectors in this exemplary embodiment are fixed but include Galvo-driven mirrors built in each projector, such that laser beam reflections are moveable to create the 3D contours. While the lasers shown are independently mounted in a fixed position, alternative configurations are contemplated in which all or a subset of laser projectors are capable of relative movement with respect to each other. For example, a laser projector can adjust its vertical position with respect to the blade mold, e.g. descend from the ceiling to be positioned closer to the mold, so as to provide a more focused line of higher resolution. The projectors can be programmed with predefined patterns for projection onto the blade mold (and/or any layup materials that may be disposed therein). Each blade design can require a distinct projection pattern, and thus a unique program inputted into the projection system.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

The invention claimed is:

1. A method for fabrication of a composite structure comprising:

providing a mold configured for forming the composite structure, the mold including at least one surface feature for receipt of an optical marker;

forming the composite structure within the mold, the composite structure having at least one surface feature corresponding to the at least one surface feature of the mold;

incorporating the optical marker at the at least one surface feature of the composite structure;

providing predetermined optical marker location(s) associated with the composite structure, the predetermined optical marker location(s) corresponding to location(s) of the at least one optical marker within the composite structure;

projecting at least one optical beam directed towards the at least one optical marker;

receiving at least one reflective beam from the at least one optical marker to identify the location of the at least one optical marker disposed on the composite structure; and comparing the predetermined optical marker location(s) to the identified optical marker location.

2. The method of claim 1, wherein the projecting is performed by a plurality of lasers.

3. The method of claim 2, wherein each of the lasers are configured for relative movement with respect to the mold.

4. The method of claim 2, wherein each of the lasers are configured for relative movement with respect to each other.

5. The method of claim 1, wherein at least one optical marker is further disposed on a vertical side of a shear web body.

6. The method of claim 5, further comprising:

providing predetermined optical marker location(s) associated with the shear web body, projecting at least one optical beam directed towards the at least one optical marker of the shear web body;

receiving at least one reflective beam from the at least one optical marker of the shear web body to identify location(s) of the at least one optical marker disposed on the shear web body; and comparing the predetermined optical marker location(s) associated with the shear web body to the identified optical marker location(s) of the shear web body, wherein, when the comparison of the predetermined optical marker location(s) and the identified optical marker location(s) do not match, adjusting a placement of the shear web body on the composite structure.

7. The method of claim 1, wherein the at least one optical beam includes a plurality of optical beams and the at least one optical marker includes a plurality of optical markers, wherein the plurality of optical beams are projected simultaneously towards the plurality of optical markers, each beam of the plurality of optical beams projected at a single optical marker, respectively.

8. The method of claim 1, wherein the at least one optical beam includes a plurality of optical beams, with select beams of the plurality of optical beams projected in a serial fashion.

9. The method of claim 1, wherein the composite structure is a wind turbine blade surface.

10. The method of claim 1, wherein the surface feature of the composite structure is formed as an aperture.

11. The method of claim 1, wherein the surface feature of the composite structure is formed as a recess.

12. The method of claim 1, wherein the at least one optical marker is configured as a mirror.

13. A method for fabrication of a wind turbine blade, the method comprising:

providing a mold configured for forming a wind turbine blade surface;

forming the wind turbine blade surface within the mold;

providing a wind turbine blade component, the wind turbine blade component including at least one optical marker;

providing predetermined optical marker location(s) associated with the wind turbine blade component;

positioning the wind turbine blade component within the wind turbine blade surface;

projecting at least one optical beam directed towards the at least one optical marker;

receiving at least one reflective beam from the at least one optical marker to identify locations of the at least one optical marker; and comparing the predetermined optical marker location(s) to the identified optical marker location and wherein the wind turbine blade component is selected from the group consisting of a shear web, a return flange, and a spar cap.

14. The method of claim 13, wherein the at least one optical marker is embedded within the wind turbine blade component.

15. The method of claim 13, wherein the least one optical marker is affixed to the wind turbine blade component.

16. The method of claim 13, wherein the at least one optical marker is coupled to the wind turbine blade component via an arm that extends from a surface of the wind turbine blade component.

17. The method of claim 13, wherein the predetermined optical marker location(s) correspond to the location(s) of the at least one optical marker, wherein the location(s) correspond to an aligned placement of the wind turbine blade component on the wind turbine blade surface.

18. The method of claim 13, when the comparison of the predetermined optical marker location(s) and the identified optical marker location do not match, adjusting a placement of the wind turbine blade component.

19. The method of claim 13, wherein the at least one optical marker is integrally formed with the wind turbine blade component.

* * * * *